(12) United States Patent
Garlick

(10) Patent No.: US 7,418,887 B2
(45) Date of Patent: Sep. 2, 2008

(54) INTEGRAL ACCUMULATOR/PUMP HOUSING

(75) Inventor: Stephen Garlick, Grand Rapids, OH (US)

(73) Assignee: Dana Automotive Systems Group, LLC, Toledo, OH (US)

(*) Notice: Subject to any disclaimer, the term of this patent is extended or adjusted under 35 U.S.C. 154(b) by 403 days.

(21) Appl. No.: 11/156,711

(22) Filed: Jun. 21, 2005

(65) Prior Publication Data
US 2006/0283319 A1    Dec. 21, 2006

(51) Int. Cl.
*F04B 9/00*     (2006.01)
*F04B 17/00*    (2006.01)
*F04B 35/00*    (2006.01)
*F16H 47/00*    (2006.01)

(52) U.S. Cl. .......................................... 74/655; 417/316
(58) Field of Classification Search .................. 74/655; 417/316
See application file for complete search history.

(56) References Cited

U.S. PATENT DOCUMENTS

| | | | |
|---|---|---|---|
| 1,863,335 A | 6/1932 | Hill | |
| 2,830,542 A | 4/1958 | Erickson et al. | |
| 2,833,219 A * | 5/1958 | Lewis | 417/380 |
| 4,519,755 A | 5/1985 | Hanson | |
| 4,597,611 A * | 7/1986 | Nishimura et al. | 303/116.4 |
| 4,645,430 A | 2/1987 | Carleton | |
| 5,310,388 A | 5/1994 | Okcuoglu et al. | |
| 5,536,215 A | 7/1996 | Shaffer et al. | |
| 5,595,214 A | 1/1997 | Shaffer et al. | |
| 5,644,916 A * | 7/1997 | Hayasaki | 60/436 |
| 5,735,764 A | 4/1998 | Shaffer et al. | |
| 5,827,145 A | 10/1998 | Okcuoglu | |
| 6,095,939 A | 8/2000 | Burns et al. | |
| 6,116,205 A | 9/2000 | Troxler et al. | |
| 6,558,537 B1 * | 5/2003 | Herrington et al. | 210/192 |
| 6,595,086 B2 * | 7/2003 | Kobayashi | 74/665 T |
| 6,648,611 B2 | 11/2003 | Morse et al. | |
| 6,672,420 B2 | 1/2004 | Porter | |
| 7,118,350 B2 * | 10/2006 | Graf et al. | 417/206 |

* cited by examiner

*Primary Examiner*—Tisha D Lewis
(74) *Attorney, Agent, or Firm*—Berenato White & Stavish

(57) ABSTRACT

An accumulator/pump housing associated with a motor vehicle hydraulic system that is designed to incorporate a gerotor pump and an accumulator. The accumulator/pump housing comprises a portion of a torque coupling assembly in which a friction clutch selectively engages and disengages a torque coupling case and at least one output shaft. The accumulator/pump housing is located external to a torque coupling housing and at least partially encloses a gerotor pump and a fluid accumulator. The gerotor pump pressurizes the hydraulic fluid and the fluid accumulator selectively stores the pressurized fluid. The hydraulic pump and accumulator supply pressurized fluid to actuate the friction clutch.

21 Claims, 6 Drawing Sheets

INTEGRAL ACCUMULATOR/PUMP HOUSING

BACKGROUND OF THE INVENTION

1. Field of the Invention

The invention generally relates to a hydraulic pressure system associated with a motor vehicle torque coupling. Specifically, the invention relates to an integral housing for a gerotor pump and associated accumulator.

2. Background of the Invention

The prior art includes various systems for developing hydraulic pressure to provide power to equipment associated with the hydraulic system of a motor vehicle, such as hydraulically actuated torque coupling assemblies. Vehicle torque coupling assemblies typically include a hydraulic pump and an accumulator. When the hydraulic pump is energized, pressurized fluid is selectively supplied into the vehicle hydraulic system, including the accumulator reservoir. As the hydraulic system is further pressurized, the volume of the accumulator reservoir expands, thereby compressing a gas charge or a resilient member (usually a spring) associated with the accumulator reservoir. When the pump is turned off, the hydraulic pressure within the accumulator reservoir is maintained through pressure applied by the gas charge or resilient member. The fluid within the accumulator reservoir communicates the hydraulic pressure to the other parts of the hydraulic system, thereby ensuring that the hydraulic system is pressurized when the vehicle hydraulic pump is not operating.

Vehicle hydraulic pumps have a variety of designs including reciprocating piston-type pumps, centrifugal pumps, and gerotor pumps. Hydraulic gerotor pumps are generally preferred in applications associated with torque couplings, including limited slip differentials. Gerotor pumps are typically built into the torque coupling assemblies and housed within the torque coupling housing. The associated accumulator is conventionally mounted to a body or frame member of the motor vehicle. Since the hydraulic pump is the source of hydraulic pressure when the pump is activated, and the accumulator is the source of hydraulic pressure when the pump is inactive, an extensive and redundant system of hydraulic pressure lines is needed to support both sources of hydraulic pressure.

While known hydraulic couplings, including but not limited to those discussed above, have proven to be acceptable for various vehicular driveline applications, such devices are nevertheless susceptible to improvements that may enhance their performance, cost and simplify both the hydraulic system and the torque coupling design. With this in mind, a need exists to develop improved hydraulic torque-coupling assemblies that advance the art.

SUMMARY OF THE INVENTION

The present invention comprises a torque coupling assembly having a rotatable torque coupling case driven by an outside drive torque. At least one output shaft is drivingly connected to the torque coupling case. A friction clutch pack selectively engages and disengages the torque coupling case and the output shaft. The torque coupling assembly also includes an accumulator/pump housing that is located external to the torque coupling case. The accumulator/pump housing at least partially encloses a fluid pump and a fluid accumulator. The fluid pump includes an internally toothed impeller member and an externally toothed rotor member. The externally toothed rotor member cooperates with the internally toothed impeller member to pressurize a fluid. The fluid accumulator is in fluid communication with an outlet port of the fluid pump and selectively stores the pressurized fluid. The fluid pump and fluid accumulator supply pressurized fluid to the frictional clutch pack.

DETAILED DESCRIPTION OF THE INVENTION

The preferred exemplary embodiment of the present invention will now be described with the reference to accompanying drawings.

Figure 1:
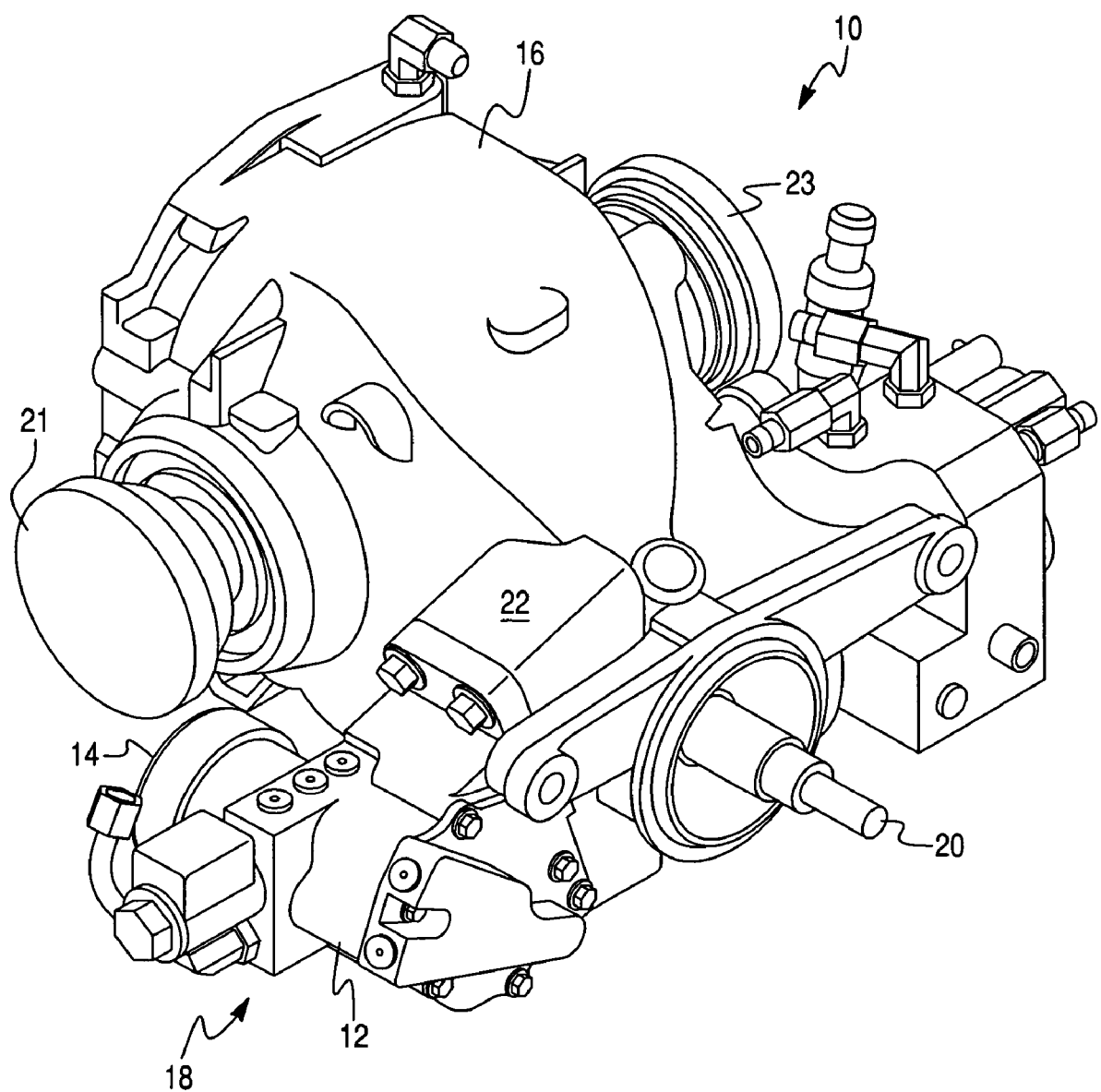
FIG. 1 is an isometric view of a torque coupling that includes an accumulator/pump housing according to the preferred embodiment of the present invention.
Figure 2:
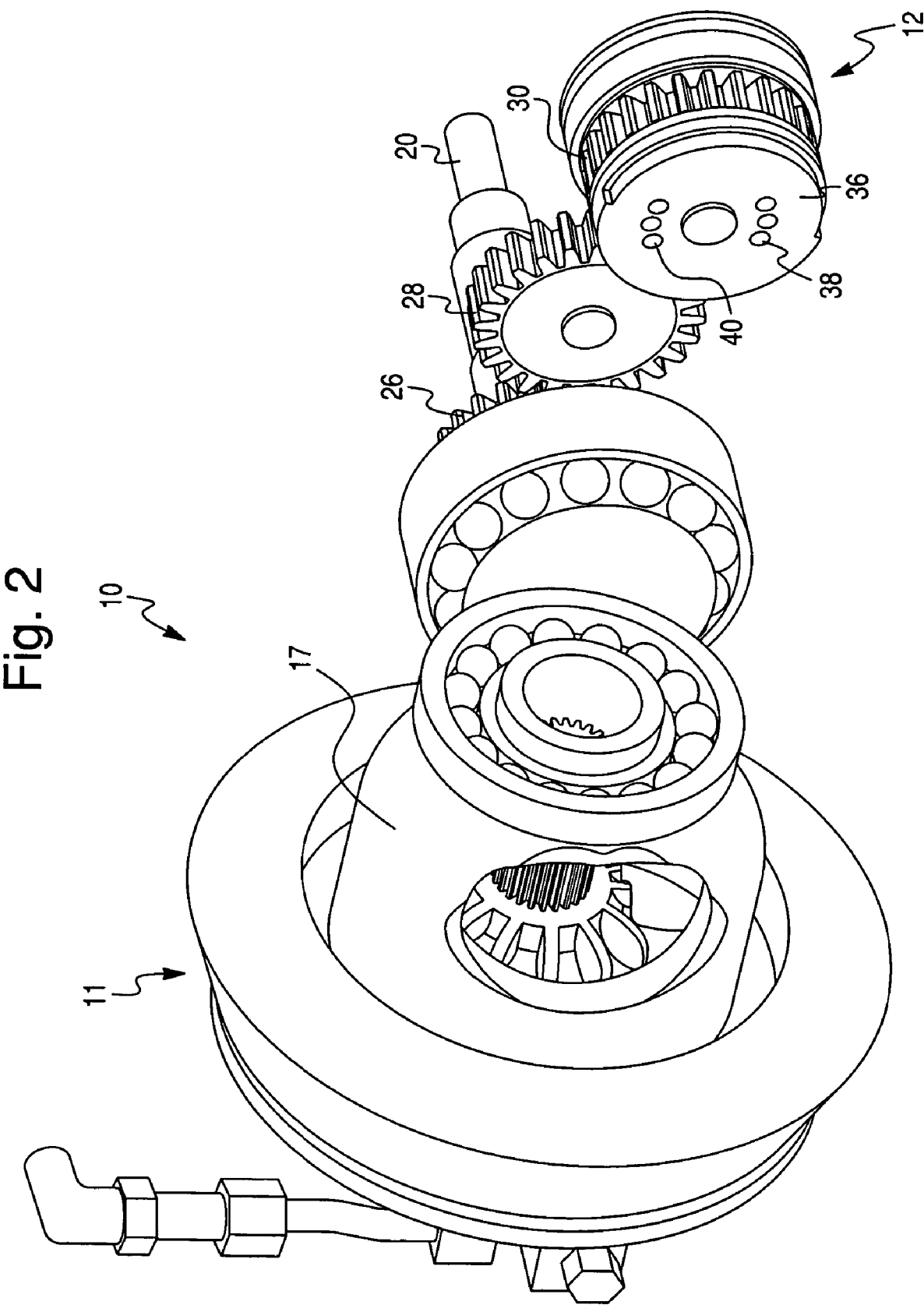
FIG. 2 is an isometric view of a gerotor pump drive train.

As best shown in FIG. 1, the preferred embodiment of the current invention comprises a limited slip differential-type torque coupling assembly 10 that includes a torque-distribution device 11 (as shown in FIG. 2) in the form of a limited slip differential disposed in a torque coupling housing 16, and a combined gerotor pump 12 and hydraulic accumulator 14 both disposed in a common, integral accumulator/pump housing 18. Preferably, the accumulator/pump housing 18 is manufactured as a single-piece casting. The accumulator/pump housing 18 is secured to the torque coupling housing 16 by any appropriate manner known in the art, such as by threaded fasteners.

Figure 6:
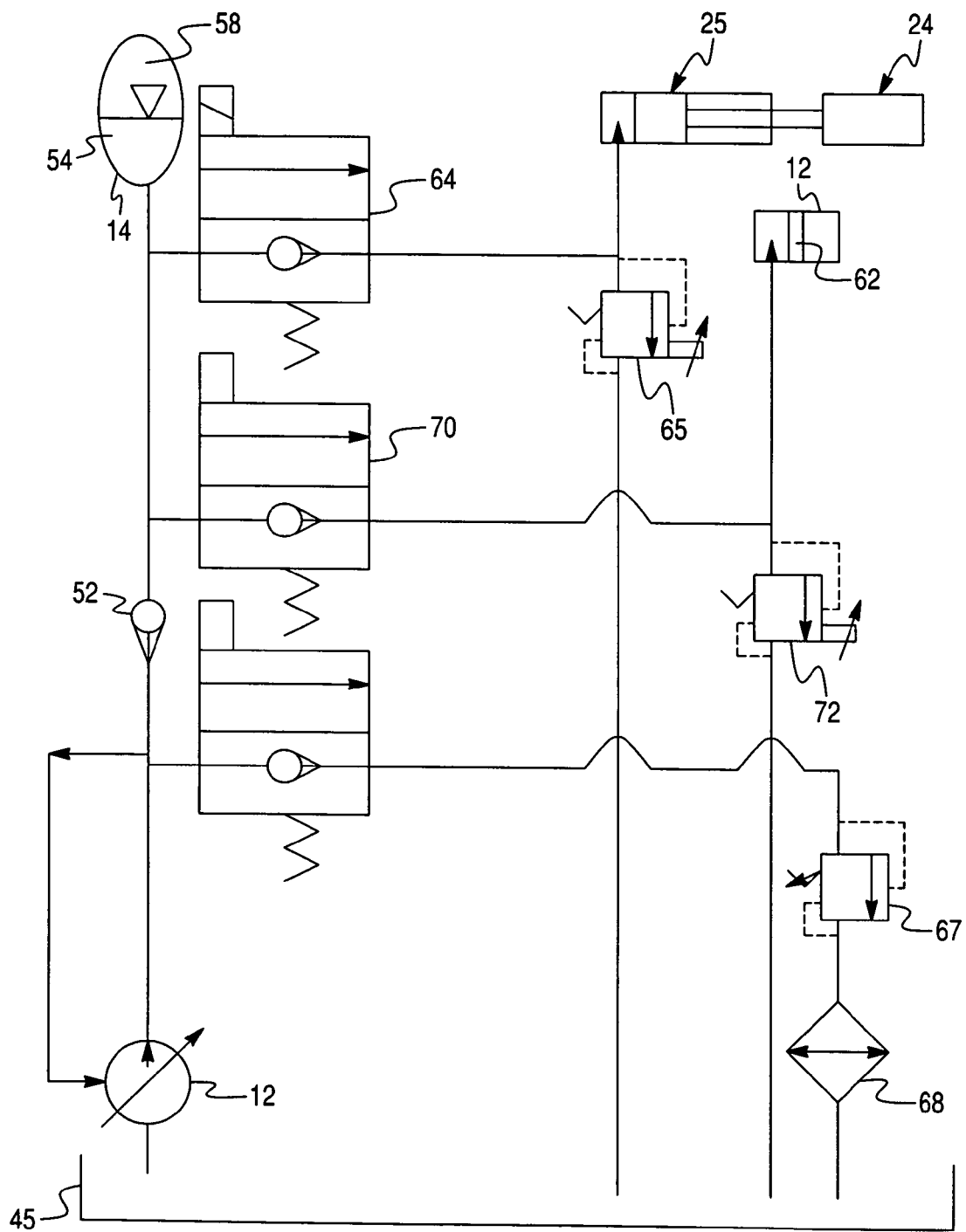
FIG. 6 is a schematic view of a hydraulic circuit according to the preferred embodiment of the present invention.

The gerotor pump 12 builds pressure in the hydraulic accumulator 14 that is used to actuate the torque-distributions device 11. The torque-distributions device 11 of the current invention is well known in the art and includes a multi-disk friction clutch 24 that is hydraulically actuated by a variable pressure piston assembly 25 as shown in FIG. 6. More specifically, the hydraulic pressure generated by the gerotor pump 12 and/or stored in the accumulator 14 is used to selectively actuate the friction clutch 24. The friction clutch 24 is disposed within a torque coupling case 17 (shown in FIG. 2) rotatably supported within the torque coupling housing 16. The current invention may also be used with any other hydraulic torque coupling known in the art.

As best shown in FIG. 1, the gerotor pump 12 and accumulator 14 are mounted outside of the torque coupling housing 16 in the common accumulator/pump housing 18. The torque coupling assembly 10 receives an input torque through an input gear shaft 20. The input torque is communicated to the gerotor pump 12 through a gearing assembly housed in an intermediate portion 22 of the torque coupling housing 16. The limited slip differential 10 selectively allocates the input torque between first 21 and second 23 output shafts extending from opposite sides of the torque coupling assembly 10.

Figure 3:
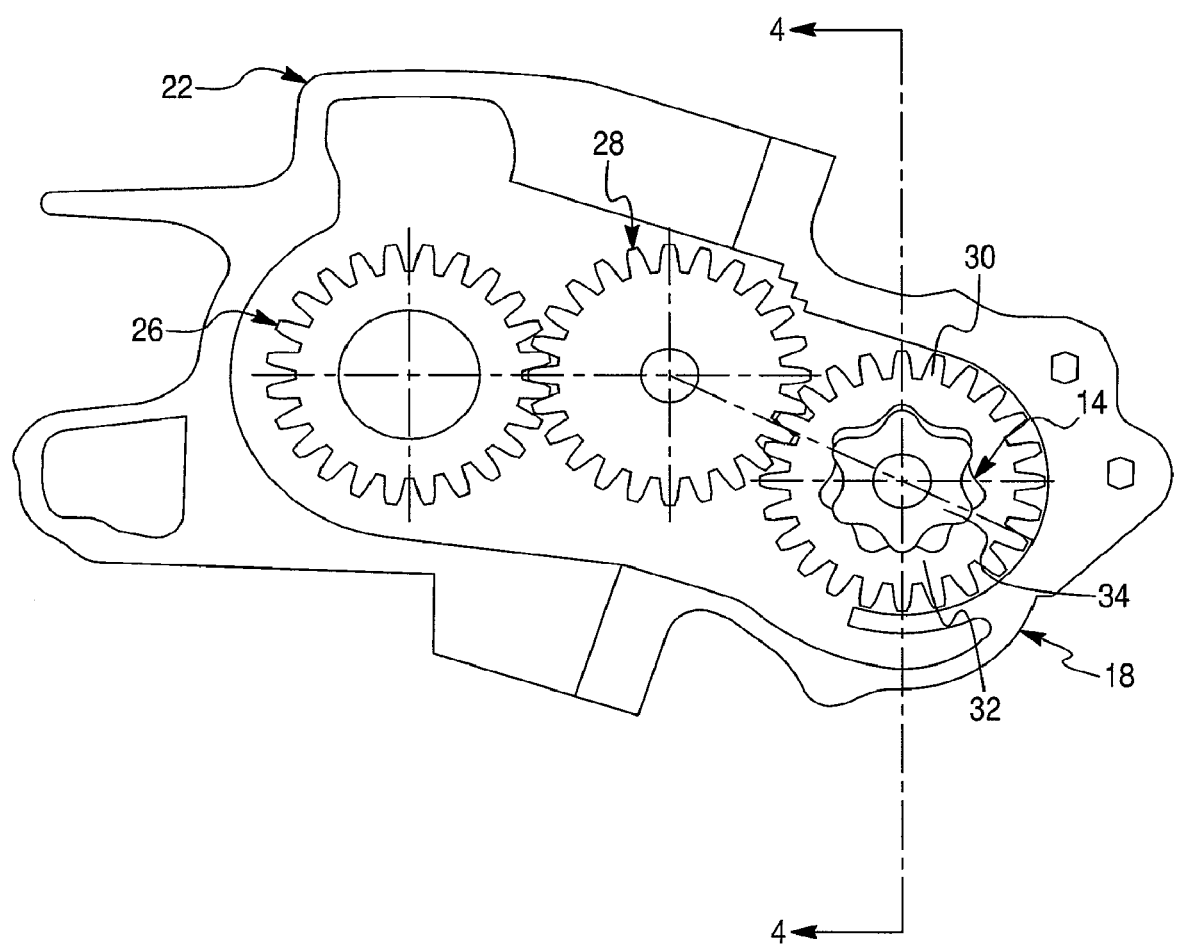
FIG. 3 is a sectional view of the drive train of the current invention.

As best shown in FIG. 2, the input shaft 20 has an associated pinion-type gear head 26 that drives an intermediate gear 28. The intermediate gear 28 meshes with teeth 30 of the gerotor pump 12 and drives the gerotor pump 12. Alternatively, the fluid pump could be driven by a chain drive, or a belt drive mechanism. As best shown in FIG. 3, the gerotor pump 12 is comprised of an internally toothed impeller member 32 and a cooperating externally toothed rotor member 34. As best shown in FIG. 2, a stationary port plate 36 is attached to one end of the gerotor pump 12. The port plate 36 includes inlet apertures 38 through which fluid is drawn into the pump 12, and outlet apertures 40 through which pressurized fluid is ejected from the pump 12. Preferably, the port plate 36, hence the gerotor pump 12, is considered "reversible" because when the direction of rotation of the drive train is reversed, the port plate 36 rotates 180° to maintain the proper alignment between the port plate 36 and the internal components of the gerotor pump 12. It would be appreciated that non-reversible pumps are also within the scope of the present invention. As best shown in FIG. 3, the gear head 26 and a portion of the intermediate gear 28 are housed in the intermediate portion 22 of the torque coupling housing 16, and the gerotor pump 12 is disposed in the separate accumulator/pump housing 18.

Figure 4:
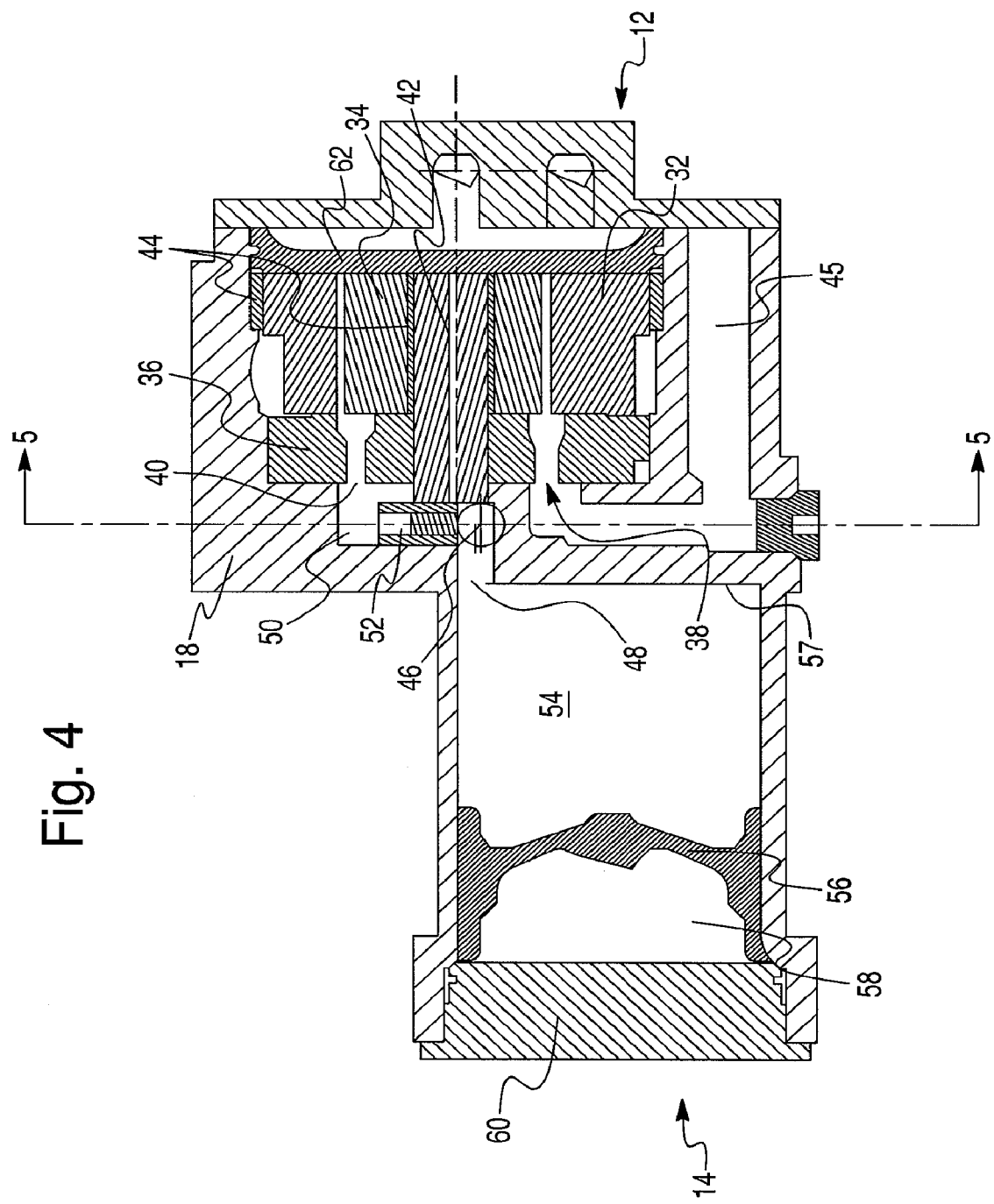
FIG. 4 is a sectional view of the current invention taken along the line 4-4 shown in FIG. 3.

FIG. 4 is a sectional view of the accumulator/pump housing 18 defining a fluid sump (or gerotor reservoir) 45 of the pump 12, and an accumulator reservoir 54, both disposed therewithin. As shown in FIG. 4, the internally toothed impeller member 32 and externally toothed rotor 34 are rotatably supported within the accumulator/pump housing 18 on a gerotor support shaft 42 and bearing sleeves 44. Hydraulic fluid from the gerotor reservoir 45 is drawn into the gerotor pump 12 through inlet apertures 38 in the port plate 36. Hydraulic fluid exits the pump 12 through the outlet apertures 40 in the port plate 36 and is directed into a connecting passage 50.

Figure 5:
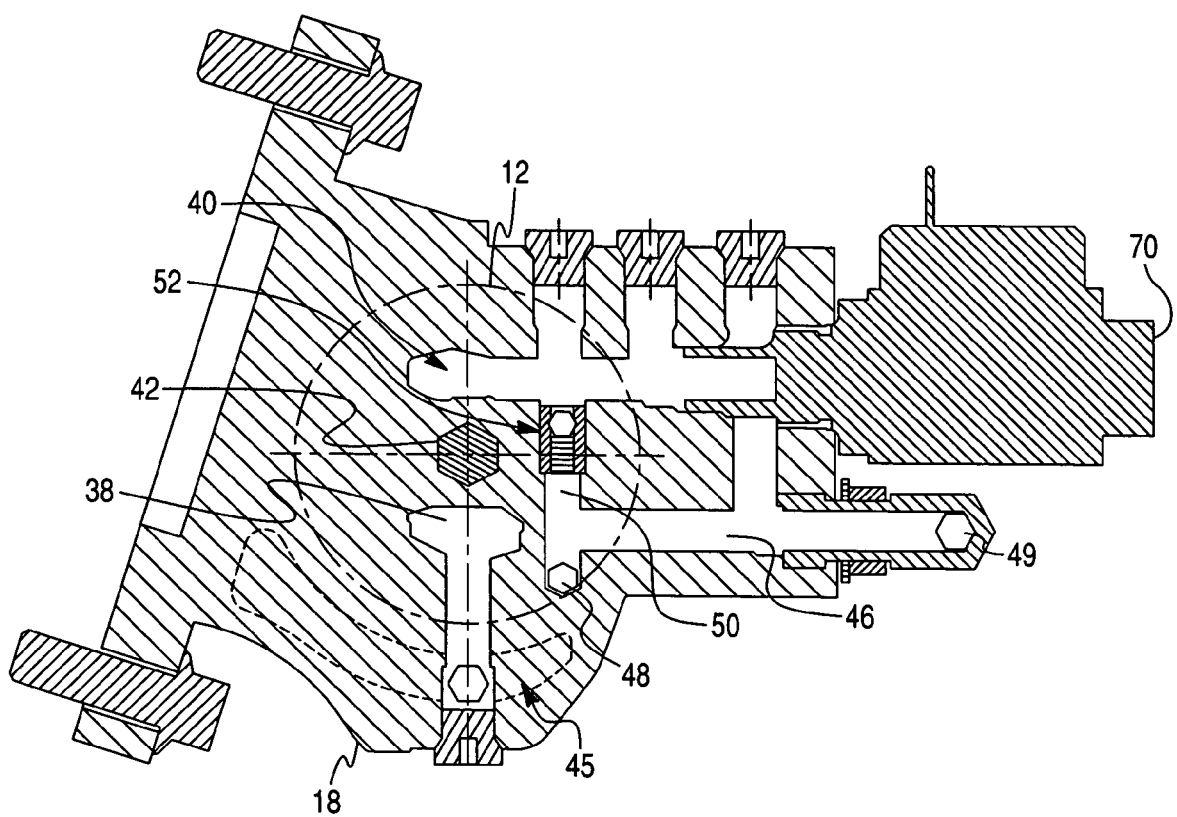
FIG. 5 is a sectional view taken along the line 5-5 shown in FIG. 4.

As best shown in FIGS. 4 and 5, the fluid in the connecting passage 50 is directed through a check valve 52. The check valve 52 ensures that hydraulic fluid only flows away from the gerotor pump 12 as is not allowed to flow in a reverse direction. In the preferred embodiment, the check valve 52 is spring-driven so that a pre-determined amount of hydraulic pressure must be generated by the gerotor pump 12 to allow fluid to flow through the passage 50.

A portion of the fluid in the passage 50 is then directed and into the accumulator reservoir 54 through an accumulator inlet/outlet aperture 48 (best shown in FIG. 4), and a portion of the fluid is directed to a passage 46 (best shown in FIG. 5). In the preferred embodiment, the accumulator 14 has a cylindrical shape and extends parallel and/or perpendicular to the gerotor support shaft 42. However, in alternate embodiments, the accumulator 14 may be of any form known in the art and may be oriented and configured as required for a specific application.

As best shown in FIG. 4, the accumulator 14 includes a piston 56 that is driven by a force-producing means 58. In the preferred embodiment, the force-producing means 58 is comprised of a gas charge, however, the force-producing means 58 may be comprised of any means known in the art, including a spring or other resilient member. When the force-producing means 58 is compressed (as shown in FIG. 4), the piston 56 applies a pressure to the hydraulic fluid within the accumulator reservoir 54. The accumulator reservoir 54 has a first end defined by the piston 56 and an oppositely disposed second end 57, such that the second end 57 is disposed adjacent to the port plate 36. A removable accumulator cap 60 is positioned opposite the inlet/outlet aperture 48 and allows the force-producing means 58 to be easily adjusted to vary the pressure exerted on the fluid in the hydraulic reservoir 54. As best shown in FIG. 5, the passage 46 connects the gerotor hydraulic system with the remainder of the hydraulic system through an outlet aperture 49.

In operation, as best shown in FIGS. 4-6, hydraulic fluid from the hydraulic gerotor reservoir 45 is drawn into the gerotor pump 12 through the inlet aperture 38 in the port plate 36. The fluid passes through the gerotor pump 12 and is ejected into the passage 50. At least a portion of the fluid is directed through the check valve 52 and into the accumulator reservoir 54. As the volume of fluid in the reservoir 54 expands, the gas charge 58 is compressed by the piston 56 of the accumulator reservoir 54. When the accumulator 14 is fully charged, the excess of pressurized hydraulic fluid generated by the pump 12 is returned to the sump 45 through a solenoid valve 66, a reducer valve 67 and a fluid cooler 68, as shown in FIG. 6.

When the gerotor pump 12 is turned off, the compressed gas charge 58 applies a force to the fluid in the accumulator reservoir 54. As best shown in FIG. 5, hydraulic pressure from the accumulator reservoir 54 is communicated through the accumulator inlet/outlet 48 to the passage 46. The hydraulic pressure is then communicated from the passage 46 out the aperture 49 to the remainder of the hydraulic system including the piston assembly 25 through a selectively actuated solenoid valve 64 and a reducer valve 65, as shown in FIG. 6. In turn, the piston assembly 25 actuates the friction clutch 25 if necessary to restrict the speed differential between the first 21 and second 23 output shafts of the torque coupling assembly 10. More specifically, the hydraulic pressure of the accumulator 14 is used to selectively actuate the friction clutch 24. The design of the current invention thereby allows the vehicle hydraulic system to be pressurized by either the gerotor pump 12 or the co-located accumulator 14.

In an alternate embodiment, as best shown in FIG. 4, the gerotor pump 12 and port plate 36 may be driven laterally by a variable pressure piston 62 to create a selectively adjustable seal between the port plate 36 and the inner wall of the accumulator/pump housing 18. The movement of the piston 62 is controlled by a solenoid valve 70 and a proportional valve 72 which are best shown in FIGS. 5 and 6. This embodiment allows an operator to further vary the pressure developed by the gerotor hydraulic system.

From the foregoing description it is clear that the current invention describes a gerotor pump 12 and accumulator 14 that are co-located in the accumulator/pump housing 18 outside the torque coupling housing 16. The current invention greatly reduces the length and number of hydraulic lines and valves relative to a conventional system. The current system allows a user to incorporate a larger accumulator and/or gerotor pump into the hydraulic system, and also facilitates removal and adjustment of the gerotor pump and accumulator components.

It is understood that while various preferred designs have been used to describe this invention, the invention is not limited to the illustrated and described features. For example, although the exemplary embodiment pictured in FIG. 1 shows a rear wheel drive-type torque coupling, front wheel drive and intermediate torque couplings should also be considered within the scope of the invention. Modifications, usages and/or adaptations following the general principles disclosed herein are included in the present invention, including such departures that come within known or customary practice in the art to which this invention pertains. The present invention is intended to encompass all such departures having the central features set forth above, without departing from the scope and spirit of the invention, and which fall within the scope of the appended claims.

What is claimed is:

1. A torque coupling assembly comprising:
   a rotatable torque coupling case disposed in a torque coupling housing and driven by an input shaft;
   at least one output shaft operatively connectable to said torque coupling case;

a friction clutch for selectively engaging and disengaging said torque coupling case and said at least one output shaft; and an integral accumulator/pump housing located external to said torque coupling housing, said accumulator/pump housing homogeneously formed as a single-piece part for enclosing therein:

a fluid pump for generating a pressurized fluid; and a fluid accumulator for selectively storing the pressurized fluid, said fluid accumulator including an accumulator reservoir being in fluid communication with an outlet port of said fluid pump;

said accumulator/pump housing defining said accumulator reservoir therewithin;

said fluid pump and said fluid accumulator supplying the pressurized fluid to said frictional clutch.

2. The torque coupling assembly of claim 1 wherein said fluid pump is a gerotor pump comprising an internally toothed impeller member and a cooperating externally toothed rotor member both rotatably supported within said integral accumulator/pump housing, and a port plate having an inlet aperture through which fluid is drawn into said pump and an outlet aperture through which the pressurized fluid is ejected from said pump.

3. The torque coupling assembly of claim 1 wherein said accumulator/pump housing is manufactured as a single-piece casting.

4. The torque coupling assembly of claim 1 wherein said fluid pump is driven by said input shaft.

5. The torque coupling assembly of claim 1 further comprising a port plate disposed between said fluid pump and said accumulator; said port plate has an inlet aperture through which fluid is drawn into said pump and an outlet aperture through which the pressurized fluid is ejected from said pump.

6. The torque coupling assembly of claim 5 wherein said accumulator reservoir has a first end and an oppositely disposed second end, wherein said second end is disposed adjacent to said port plate.

7. The torque coupling assembly of claim 6 further comprising an accumulator piston, said accumulator piston defining said accumulator first end.

8. The torque coupling assembly of claim 7 further comprising a force generating means, said force generating means urging said piston toward said accumulator second end.

9. The torque coupling assembly of claim 8 wherein said force generating means is a gas charge.

10. The torque coupling assembly of claim 8 wherein said force generating means is a resilient member.

11. The torque coupling assembly of claim 10 wherein said force generating means is a spring.

12. The torque coupling assembly of claim 1 wherein said accumulator reservoir is cylindrical in shape.

13. The torque coupling assembly of claim 1 wherein said accumulator and said fluid pump are positioned on a common plane.

14. The torque coupling assembly of claim 2, wherein said impeller member, said rotor member and said port plate of said fluid pump are laterally selectively moveable within said accumulator/pump housing.

15. The torque coupling of claim 14 further comprising a variable pressure piston to move said impeller member, said rotor member and said port plate of said fluid pump laterally toward said accumulator.

16. The torque coupling of claim 15 further comprising a solenoid valve to control said variable pressure piston.

17. The torque coupling of claim 1 wherein a check valve is disposed between said fluid pump and said accumulator.

18. The torque coupling of claim 2, wherein said accumulator extends parallel or perpendicular to a gerotor support shaft rotatably supporting said externally toothed rotor member in said integral accumulator/pump housing.

19. The torque coupling of claim 5 wherein said port plate is reversible.

20. The torque coupling of claim 1 wherein said integral accumulator/pump housing is attached to said torque coupling housing by threaded fasteners.

21. A torque coupling assembly comprising:

a torque coupling case rotated by an outside drive torque through an input shaft;

at least one output shaft operatively connected to said torque coupling case;

a friction clutch for selectively engaging and disengaging said torque coupling case and said at least one output shaft; and an integral accumulator/pump housing located external to said torque coupling case; said accumulator/pump housing homogeneously formed as a single-piece part for enclosing therein:

a gerotor pump driven by a pinion gear of said input shaft and at least one intermediate gear for generating hydraulic pressure, said gerotor pump comprising an internally toothed impeller member and a cooperating externally toothed rotor member both rotatably supported within said integral accumulator/pump housing, and a port plate having an inlet aperture through which fluid is drawn into said pump and an outlet aperture through which the pressurized fluid is ejected from said pump;

said impeller member, said rotor member and said port plate being selectively laterally moveable within said accumulator/pump housing; and a cylindrical fluid accumulator for selectively storing the pressurized fluid generated by said gerotor pump, said fluid accumulator including an accumulator reservoir defined within said accumulator/pump housing and having a first end and a second end, said first end being defined by a gas charge-driven piston, said accumulator being in fluid communication with an outlet port of said fluid pump so that said fluid pump pressurizes said accumulator;

said port plate being disposed between said fluid accumulator and said cooperating impeller and rotor members of said gerotor pump;

said fluid pump and said fluid accumulator supplying the pressurized fluid to said frictional clutch for engaging said outside torque drive to said at least one output shaft.

* * * * *